United States Patent
Hashimoto et al.

(10) Patent No.: US 7,055,498 B2
(45) Date of Patent: Jun. 6, 2006

(54) THROTTLE ASSEMBLY FOR INTERNAL COMBUSTION ENGINE, AND THROTTLE SENSOR

(75) Inventors: Yoshikatsu Hashimoto, Hitachiohta (JP); Toshifumi Usui, Hitachinaka (JP); Shigeru Tokumoto, Hitachinaka (JP); Yasuo Saito, Hitachinaka (JP); Eisuki Wayama, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 19 days.

(21) Appl. No.: 10/737,993

(22) Filed: Dec. 18, 2003

(65) Prior Publication Data

US 2004/0123838 A1    Jul. 1, 2004

Related U.S. Application Data

(63) Continuation of application No. 09/763,947, filed as application No. PCT/JP00/02196 on Apr. 5, 2000, now Pat. No. 6,691,678.

(51) Int. Cl.
*F02D 9/08* (2006.01)
*F02D 41/02* (2006.01)
*F16K 1/22* (2006.01)

(52) U.S. Cl. .................. 123/361; 123/337; 123/399

(58) Field of Classification Search ............... 123/361, 123/399, 337; 251/305; 73/118.1, 118.2; 338/160, 162, 171, 184
See application file for complete search history.

(56) References Cited

U.S. PATENT DOCUMENTS

| | | | | |
|---|---|---|---|---|
| 4,355,293 A | * | 10/1982 | Driscoll | 338/184 |
| 4,430,634 A | * | 2/1984 | Hufford et al. | 338/164 |
| 4,621,250 A | * | 11/1986 | Echasseriau et al. | 338/162 |
| 4,679,440 A | * | 7/1987 | Okamura | 73/118.1 |
| 4,719,795 A | * | 1/1988 | Eitoku et al. | 73/118.1 |
| 4,743,882 A | * | 5/1988 | Simon | 338/184 |
| 4,873,960 A | * | 10/1989 | Kamifuji et al. | 123/480 |
| 5,065,721 A | * | 11/1991 | Wiggins et al. | 123/399 |
| 5,070,728 A | * | 12/1991 | Kubota et al. | 73/118.1 |
| 5,168,850 A | * | 12/1992 | Zentgraf et al. | 123/399 |
| 5,321,980 A | * | 6/1994 | Hering et al. | 73/118.1 |

(Continued)

FOREIGN PATENT DOCUMENTS

EP    1270907    *    1/2003

(Continued)

*Primary Examiner*—Hai Huynh
(74) *Attorney, Agent, or Firm*—Crowell & Moring LLP

(57) ABSTRACT

In a throttle body there are provided a throttle valve for controlling the flow of intake air in an internal combustion engine, an electrically-driven actuator for actuating the throttle valve, and a reduction gear mechanism for the actuator, and a receptacle portion for receiving the reduction gear mechanism therein is formed in a side wall of the throttle body. A cover which covers the receptacle portion is attached to a side wall of the throttle body. The throttle assembly of the invention is provided with a potentiometer type sensor for detecting the degree of opening of the throttle valve, the sensor comprising a slider and a resistor, the slider being adapted to slide on the resistor and mounted to a peripheral surface of a driven gear so that a tip end thereof faces in a radial direction of a throttle valve shaft, the driven gear being disposed on the throttle valve shaft side of the reduction gear mechanism. On the other hand, the resistor is constituted by a curved resistor which confronts the slider in the said radial direction. A wall portion which holds the curved resistor is formed by molding integrally with the aforesaid cover.

7 Claims, 13 Drawing Sheets

U.S. PATENT DOCUMENTS

| | | | |
|---|---|---|---|
| 5,401,001 A * | 3/1995 | Cook et al. ................. 251/308 |
| 5,476,426 A * | 12/1995 | Nakamura et al. .......... 477/115 |
| 5,602,732 A * | 2/1997 | Nichols et al. ................ 701/29 |
| 5,672,818 A * | 9/1997 | Schaefer et al. ........... 73/118.2 |
| 5,684,407 A * | 11/1997 | Zdanys et al. .............. 324/714 |
| 5,687,691 A * | 11/1997 | Kaiser et al. ............... 123/337 |
| 5,743,132 A * | 4/1998 | Hosoya et al. ............. 73/118.2 |
| 6,029,510 A * | 2/2000 | Nakaie et al. ............. 73/118.1 |
| 6,031,448 A * | 2/2000 | Starkweather et al. ...... 338/106 |
| 6,040,756 A * | 3/2000 | Kaijala ....................... 338/160 |
| 6,075,371 A * | 6/2000 | Kitamura .................... 324/716 |
| 6,109,239 A * | 8/2000 | Watanabe ................... 123/396 |
| 6,140,907 A * | 10/2000 | Liu ............................. 338/160 |
| 6,173,939 B1 * | 1/2001 | Dottavio et al. ........ 251/129.12 |
| 6,240,899 B1 * | 6/2001 | Yamada et al. ............. 123/396 |
| 6,279,535 B1 * | 8/2001 | Matsusaka .................. 123/399 |
| 6,288,534 B1 * | 9/2001 | Starkweather et al. ... 324/207.2 |
| 6,349,701 B1 * | 2/2002 | Sakurai et al. .............. 123/399 |
| 6,371,080 B1 * | 4/2002 | Saito et al. ................. 123/337 |
| 6,386,020 B1 * | 5/2002 | Okumura .................... 73/118.1 |
| 6,390,062 B1 * | 5/2002 | Saito et al. ................. 123/399 |
| 6,400,141 B1 * | 6/2002 | Apel et al. ................ 324/207.2 |
| 6,407,543 B1 * | 6/2002 | Hagio et al. ............ 324/207.25 |
| 6,448,762 B1 * | 9/2002 | Kono et al. ............... 324/207.2 |
| 6,701,892 B1 * | 3/2004 | Wayama et al. ............. 123/399 |
| 6,866,018 B1 * | 3/2005 | Kaiser et al. ............... 123/337 |
| 2001/0037794 A1 * | 11/2001 | Wayama et al. ............. 123/399 |
| 2001/0045203 A1 * | 11/2001 | Arsic et al. ................. 123/399 |
| 2002/0050920 A1 * | 5/2002 | Fliegner .................... 338/162 |

FOREIGN PATENT DOCUMENTS

| | | | |
|---|---|---|---|
| JP | 130403 | * | 5/1990 |
| JP | 86340 | * | 3/1992 |
| JP | 5-99606 | * | 4/1993 |
| JP | 236447 | * | 9/1997 |
| JP | 89292 | * | 2/2002 |

* cited by examiner

CLOSE → OPEN

CLOSE → OPEN

THROTTLE ASSEMBLY FOR INTERNAL COMBUSTION ENGINE, AND THROTTLE SENSOR

BACKGROUND OF THE INVENTION

1. Technical Field

The present invention relates to a throttle assembly for controlling the flow (amount of the flow) of intake air in an internal combustion engine, as well as a throttle sensor for detecting the degree of opening of a throttle valve used in the throttle device.

2. Background Art

Heretofore, an electronically controlled throttle assembly has practically been used wherein the operation of a throttle valve in an engine is controlled by an electrically-driven actuator (e.g., a DC motor or a stepping motor).

The electronically controlled throttle assembly controls the throttle valve angle (throttle valve opening) to an optimum value according to the state of an engine and in accordance with a signal indicative of the degree of opening of an accelerator pedal or a traction control signal. To this end, a sensor for detecting the angle of the throttle valve, what is called a throttle sensor (also called an opening meter or a throttle position sensor) is attached to a throttle body.

As the throttle sensor there generally is adopted a potentiometer type sensor, wherein a brush (slider) adapted to rotate together with a throttle valve shaft slides on a resistor, thereby outputting a potential difference signal (sensor detection signal) corresponding to the degree of opening of a throttle valve.

As throttle sensors of this type so far used there are known, for example, such throttle sensors as are disclosed in Japanese Patent Laid Open Nos. 7-343878 and 9-32588, wherein a resistor and a wiring pattern of a potentiometer are formed on a substrate. The substrate is attached to a cover of a receptacle portion containing a reduction gear mechanism. A brush is attached to a flat surface of a driven gear (or a rotor) mounted on a throttle valve shaft. In this type of a throttle sensor, the brush slides on a resistor and a conductor both formed on the substrate (a flat surface). Since the driven gear is used also as a moving element to which the brush of the potentiometer is attached, the number of components used can be so much reduced.

SUMMARY OF THE INVENTION

It is an object of the present invention to provide a throttle device capable of contributing to reducing the number of components of a throttle sensor, capable of reducing the manufacturing cost and simplifying the assembling work, and further capable of ensuring high accuracy and reliability of the sensor.

DISCLOSURE OF INVENTION

For achieving the above-mentioned object the present invention basically proposes the following throttle assemblies:

(1) A throttle assembly comprising a throttle body having a throttle valve, an electrically-driven actuator for actuating the throttle valve, and a sensor for detecting the degree of opening of the throttle valve, wherein the sensor is constituted by a potentiometer whose output varies according to the rotation of a throttle valve shaft and which comprises a slider (also called a brush) and a resistor, the slider being adapted to slide on the resistor and disposed on one end side of a throttle valve shaft so that a tip end thereof faces in a radial direction of the throttle valve shaft, the resistor being formed as an arcuately curved surface (what is called a curved resistor), and a wall portion which holds the curved resistor is formed by molding integrally with a cover which covers the one end side of the throttle valve shaft in the throttle body.

According to a preferred example of the above throttle device (1), the peripheral resistor holding portion (wall portion) is formed by molding integrally with the cover, as described above, and the slider is attached to a peripheral portion of a gear (a driven gear as a final-stage gear in a reduction gear mechanism) mounted on the throttle valve shaft.

(2) A throttle assembly comprising a throttle body and, as components mounted to the throttle body, a throttle valve for controlling the flow of intake air in an internal combustion engine, an electrically-driven actuator for actuating the throttle valve, a reduction gear mechanism for the actuator, and a sensor for detecting the degree of opening of the throttle valve, wherein one end of a throttle valve shaft is projected outwards from a side wall of the throttle body, the reduction gear mechanism and the sensor are disposed on a side face of the throttle body on the projecting side of the throttle valve shaft, a bearing which supports one end of the throttle valve shaft on the projecting side of the throttle valve shaft, out of bearings which support the throttle valve shaft, is a ball bearing, a bearing located on the opposite side of the throttle valve shaft is a cap-shaped plain bearing, and one bearing boss of the throttle valve shaft is covered with the plain bearing.

(3) A throttle sensor for detecting the degree of opening of a throttle valve which controls the flow of intake air in an internal combustion engine, wherein the throttle sensor is constituted by a potentiometer whose output varies according to the rotation of the throttle valve, the potentiometer comprising a slider adapted to rotate integrally with a throttle valve shaft and a resistor on which the slider slides, the resistor being connected at one end thereof to a positive-side terminal of a power supply and at an opposite end thereof to a ground-side terminal, the position at which the resistor contacts the slider is an output point for taking out an output voltage, and an auxiliary resistor (or resistors) is connected either between one end of the resistor and the positive-side terminal of the power supply or between the opposite end of the resistor and the ground-side terminal, or both. In other words, an auxiliary resistor is provided at one end or at each of both ends of the resistor which is a component of the potentiometers

DESCRIPTION OF THE PEEFERRED EMBODIMENTS

An embodiment of the present invention will be described hereinunder with reference to the accompanying drawings.

Figure 1:
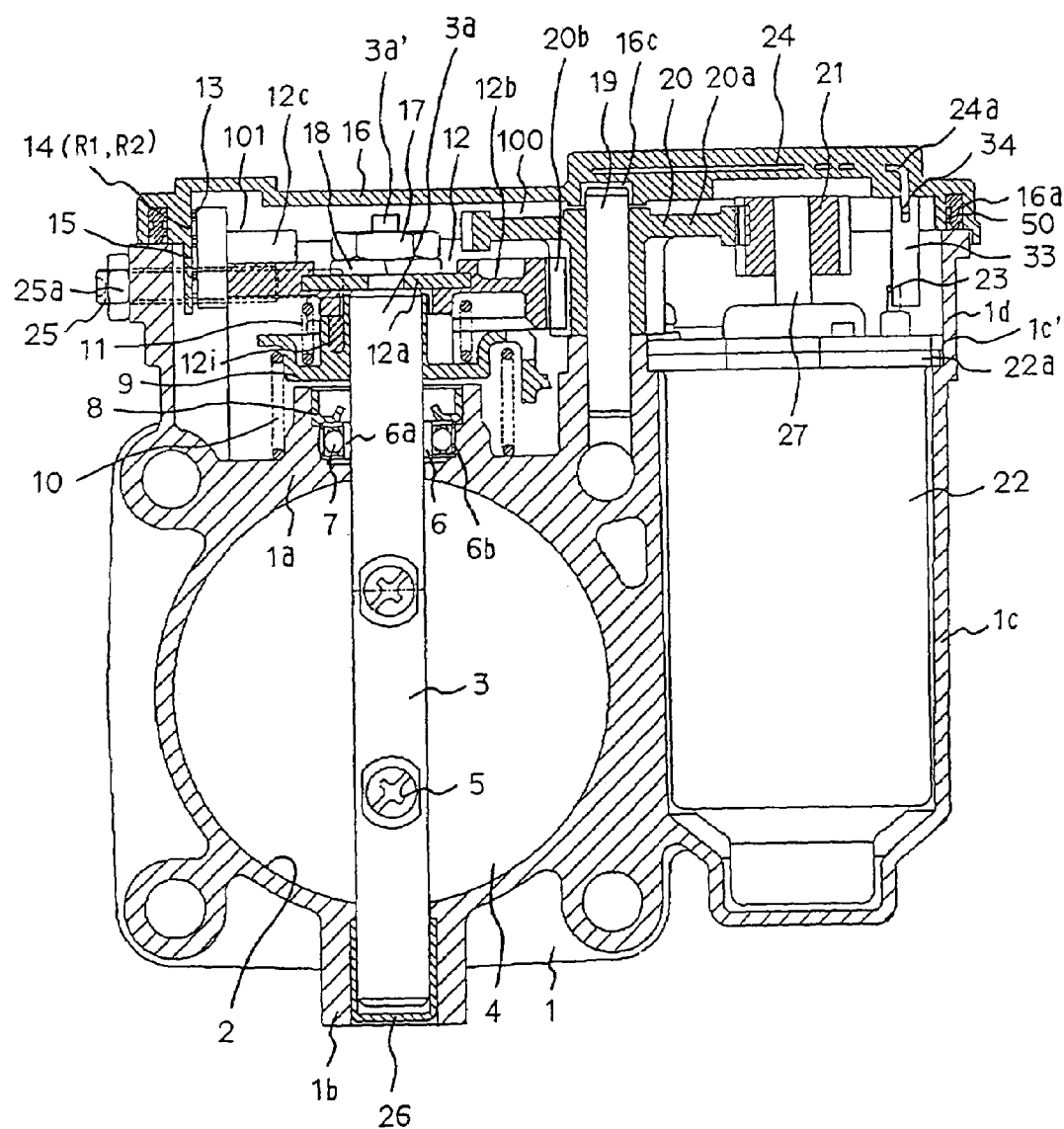
FIG. 1 is a longitudinal sectional view of a throttle assembly according to an embodiment of the present invention and FIG. 2 is a plan view showing a throttle body used in the embodiment, with a cover 16 removed from the throttle body to see the uncovered interior. A gear indicated at 12 in FIG. 2 is mounted to a throttle valve shaft on the throttle body side, but in the same figure, for understanding in what positional relation the gear 12 is inside the gear cover 16, the gear 12 alone is removed from the throttle valve shaft 3 and is illustrated together with the gear cover.

As shown in FIG. 1, an electronically controlled throttle assembly (throttle valve assembly) is composed principally of a throttle body 1, which may be referred to simply as the body hereinafter, a throttle valve 4, a motor (a throttle valve driving unit or an electrically-driven actuator) 22 for actuating the throttle valve 4, a reduction gear mechanism 100, a sensor (throttle sensor) 101 for detecting the angle (degree) of opening, which may be referred to simply as opening hereinafter, of the throttle valve 4, and a cover 16 for protecting a throttle valve shaft 3, motor 22 and reduction gear mechanism 100.

The body 1 is formed by molding a receptacle portion (intake bore) 2 for the throttle valve 4 and a receptacle portion (motor housing) 1c for the motor 22 integrally with each other. The throttle valve 4 is mounted to the shaft 3 with screws 5, and the shaft 3 is supported by bearings 6 and 26 which are installed in the body 1.

Various bearings are mentioned as examples of the bearing 6, among which a ball bearing has heretofore been used as a bearing usually adopted. In this embodiment, a ball bearing and a cap-shaped plain bearing are used as the bearings 6 and 26, respectively. The reason therefor and their details will be described later. The ball bearing 6 is secured to a bearing boss 1a through a seal ring 8. An inner ring 6a of the ball bearing 6 is press-fitted on an outer periphery of the throttle valve shaft 3, while an outer ring 6b thereof is fitted in an inner periphery of the bearing boss 1a by transition fit (sliding fit).

Only one end of the throttle valve shaft 3 projects to the exterior of a side wall of the body 1, and a spring 10, a lever 9, a spring 11, and a final-stage gear (driven gear) 12 in the reduction gear mechanism 100, which will be described later, are fitted on the projecting one end of the throttle valve shaft. The plain bearing 26 is mounted by press-fitting for examples.

Throttle valve-related components (hereinafter referred to as the throttle valve mechanism) such as the throttle valve shaft 3, reduction gear mechanism 100 and motor 22 are accommodated within a receptacle portion (case) Id formed in a side wall of the body 1, the receptacle portion id being covered with a synthetic resin cover 16.

Figure 4:
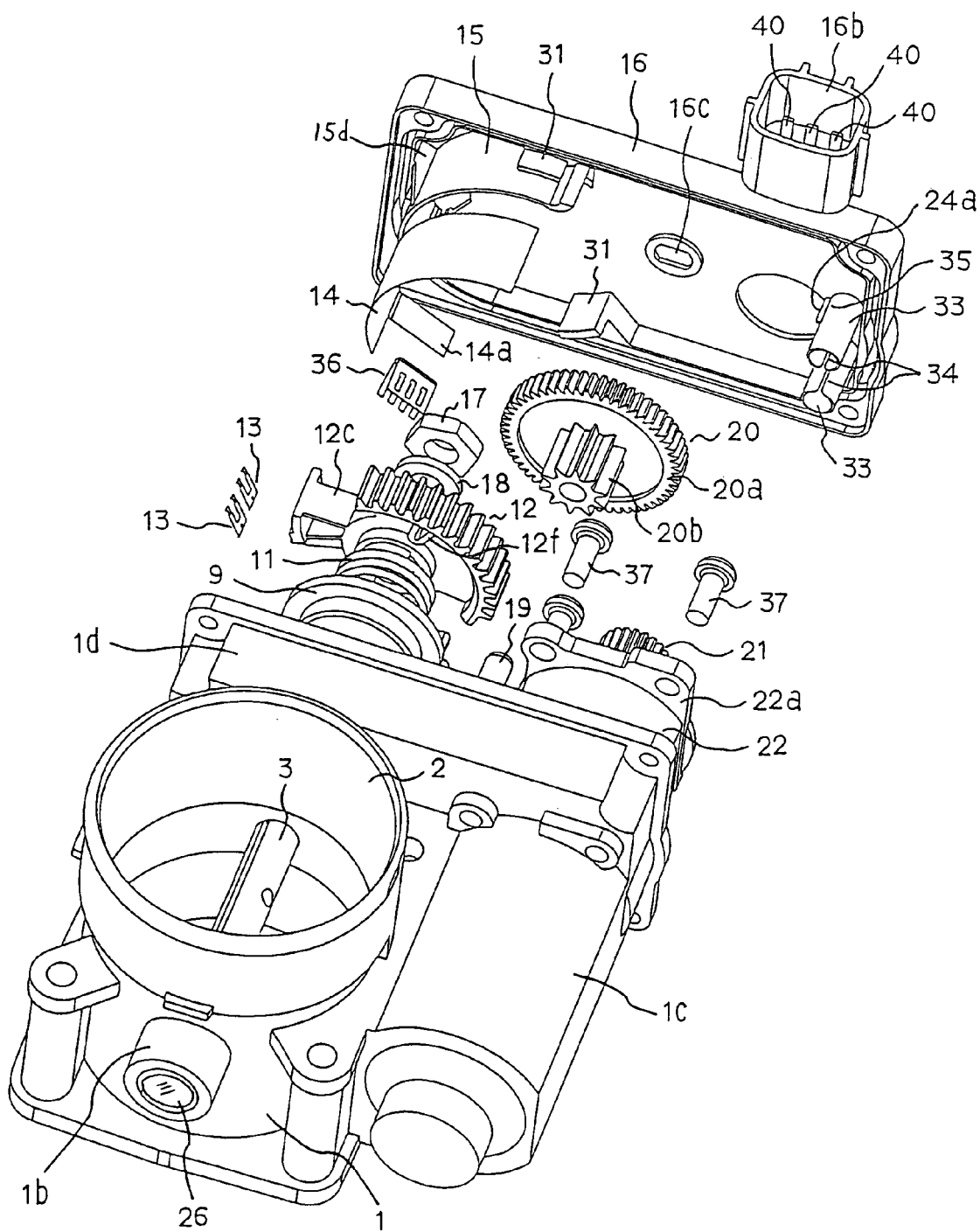
FIGS. 4, 5 and 6 are exploded perspective views showing the throttle assembly of this embodiment as seen in different angles.
Figure 5:
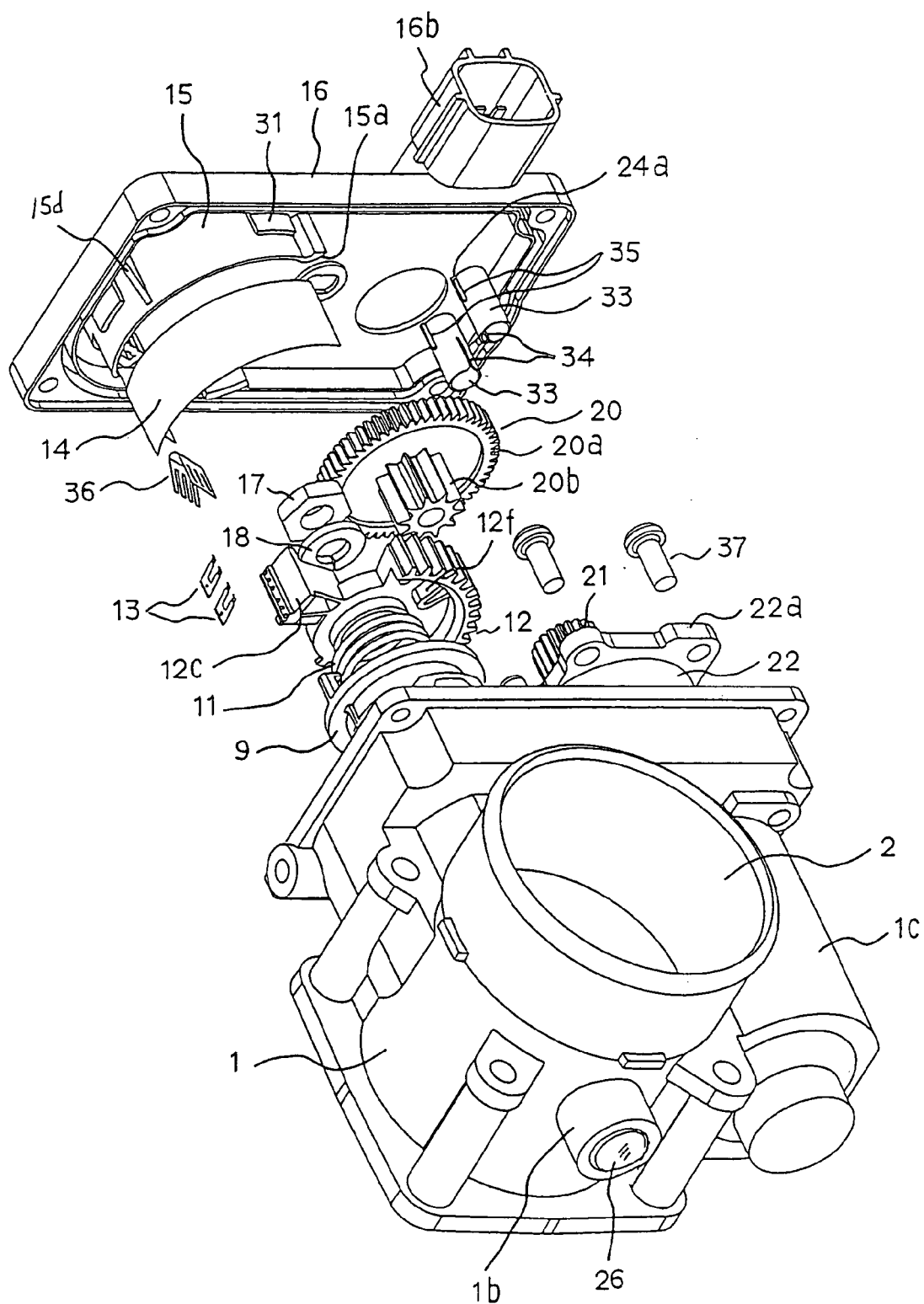
Figure 6:
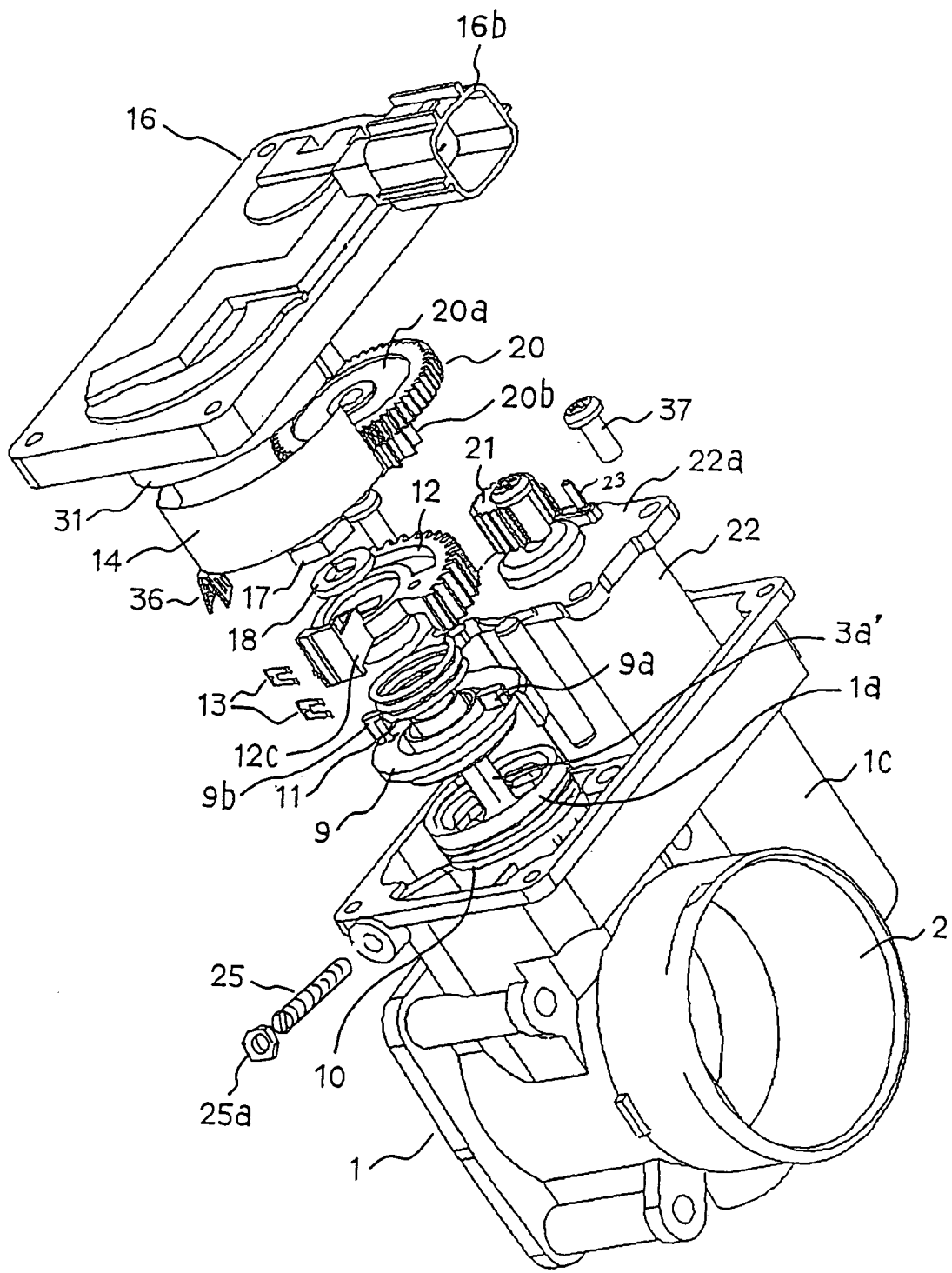

More specifically, the throttle valve mechanism is disposed so as to be protected by a single cover 16, an opening (a motor mounting opening) 1c' of the motor housing 1c is positioned so as to face the interior of the receptacle portion 1d, through which opening the motor 22 is received into the housing, and an end bracket 22a of the motor is fixed with screws 37 around the opening 1c' (see FIGS. 4 to 6).

Motor terminals 23 formed on the end bracket 22a are positioned near a side wall of the receptacle portion 1d so as to face toward the cover 16 and are connected to relay terminals 24a through relay connectors 33. The relay connectors 33 may be in any of various forms. In this embodiment, sleeves are used as the relay connectors 33, slits 34 and 35 (see FIG. 5) are formed respectively in both ends of each of the slits in 90°-shifted directions, and each motor terminal 23 and relay terminal 24a are fitted in the slits 34 and 35. The terminals 23 and 24a also face in 90°-shifted directions to match the extending directions of the slits 34 and 35.

The motor 22 is driven in accordance with an accelerator signal related to the depression quantity of an accelerator pedal and a traction control signal, and the power of the motor 22 is transmitted to the throttle valve shaft 3 through the reduction gear mechanism 100 (a motor pinion 21, an intermediate gear 20, and the final-stage fear 12). The pinion 21 is mounted on a motor shaft 27 and the intermediate gear 20 is fitted free on a shaft 19 which is fixed to the throttle body 1. The intermediate gear 20 comprises a gear 20a of a larger diameter meshing with the pinion 21 and a gear 20b of a smaller diameter meshing with the gear 12.

The final-stage gear 12 is a sectorial gear and, as shown in FIGS. 2 to 6 and FIG. 8, a holder 12c for holding brushes (sliders) 13 of a potentiometer is integral with the gear 12. The holder 12c is formed so as to be positioned on a peripheral surface of the gear 12 on the side opposite to a toothed area of the same gear.

Figure 8:
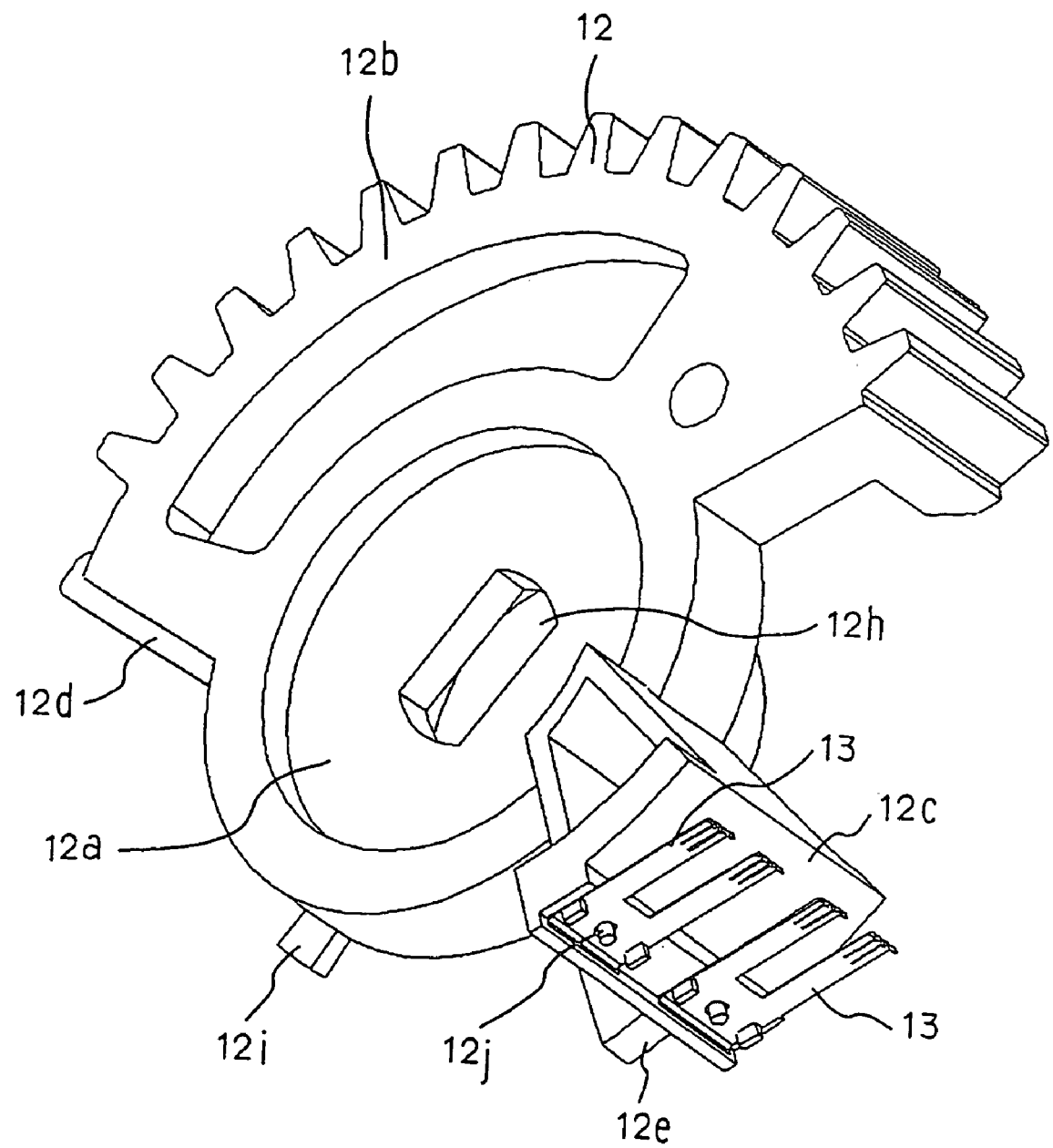
FIG. 8 is a perspective view showing a driven gear with brush (slider) which is one of reduction gears used in the embodiment.

Before describing features of the gear 12 in detail, reference will first be made to the relation between the gear 12 and the lever 9. As shown in FIG. 8, the gear 12 has a hole 12h for passing one end 3a' (having at least two flat surfaces) of the throttle valve shaft 3 therethrough. The hole 12h is formed in a shape engageable with the one end 3a' of the throttle valve shaft, and through this engagement the gear 12 rotates integrally with the throttle valve shaft 3.

The lever 9 is fitted free on the outer periphery (circumferential surface) of the throttle valve shaft 3 so that the lever 9 and the gear 12 are pulled toward each other-through a spring 11. For example, a lug indicated at 12f in FIGS. 2 to 4 comes into engagement with a lug 9a of the lever 9 shown in FIG. 6. The lug 12f is formed inside the gear 12. Further, a lug 12g formed on the gear 12 is for positioning in an assembling work relative to a lug 9b formed on the lever 9 side.

A spring 10 is a return spring for the throttle valve. One end of the spring 10 is anchored to a spring retaining portion (not shown) provided on the body 1 side and the opposite end thereof is anchored to the lever 9.

The spring 10, which imparts a return force to the throttle valve shaft through the gear 12, constitutes a known default opening setting mechanism in cooperation with the spring 11 and the lever 9.

The default opening setting mechanism is for holding an initial opening of the throttle valve larger than a fully closed position during OFF of an engine key (in other words, while the electrically-driven actuator 22 is de-energized). From a default opening position up to a fully open control position, a throttle valve opening is determined in accordance with the balance between the motor power and the spring (return spring) 10. For controlling the throttle valve opening smaller than the default opening, the movement of the lever 9 is prevented by a default opening stopper (not shown) and only the gear 12 and the throttle valve shaft 3 are turned in fully closing direction against the force of the spring 11. Numeral 25 denotes a fully closing stopper which defines a mechanical fully closed position of the throttle valve, which fully closed position is determined by abutment of a movable-side stopper 12d against the stopper 25, the stopper 12d being formed on one side of the sectorial gear 12. The stopper 12d is fixed with a nut 25a.

Figure 10:
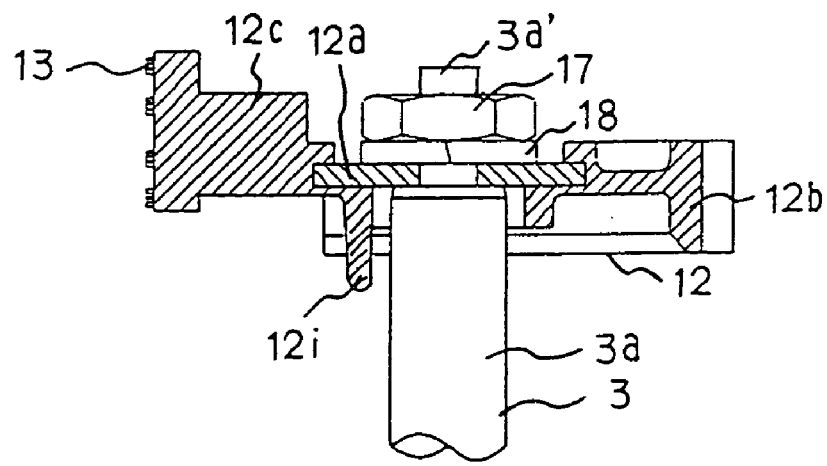
FIG. 10 is a sectional view showing the driven gear as mounted to a throttle valve shaft.

As to the material of the gear 12 used in this embodiment, as is seen from a sectional view of FIG. 10, a central portion is constituted by a metallic plate 12a, and a teeth-forming portion 12b, the brush holder 12c and the remaining portion are formed integrally by molding a synthetic resin (a reinforced plastic). In this case, the metallic plate 12a is insert-molded into the resin portion of the gear. The movable-side stopper 12d is integral with the metallic plate 12a.

The stopper 12d is formed of a metal for improving the accuracy of the stopper position. More particularly, the mechanical fully closed position of the throttle valve serves as a reference point in control and the stopper 12d strikes against the fixed-side fully closing stopper 25 once at every beginning or end of operation. Thus, a high accuracy is required for the stopper 12d, and for this reason the stopper 12d is formed of a metal which is high in rigidity.

Figure 2:
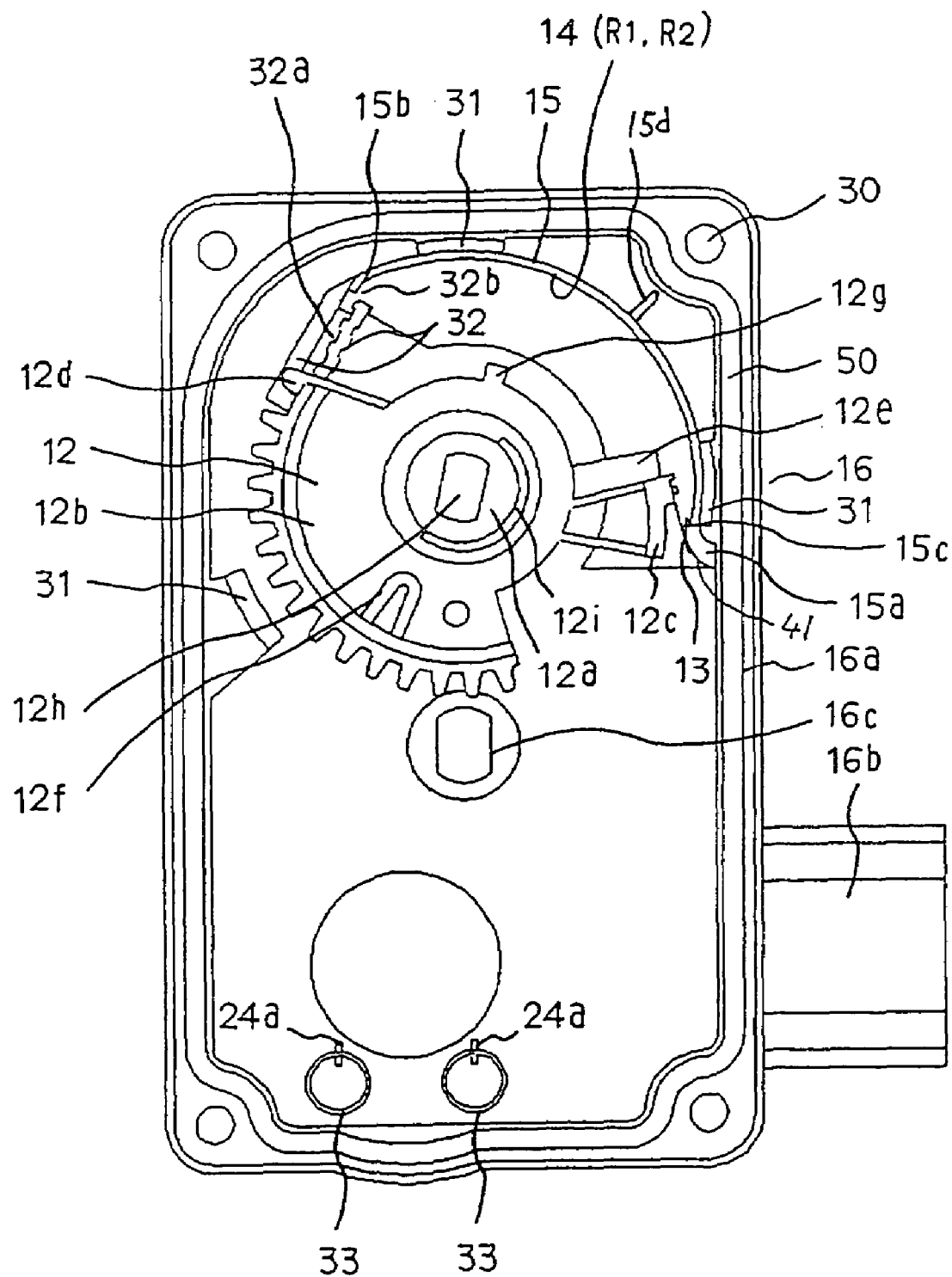

The gear 12 is further provided with a movable-side stopper 12e for defining a fully open position of the throttle valve (FIGS. 2 and 8). The stopper 12e is formed by molding a synthetic resin integrally with the gear 12 and the brush holder 12c. It suffices for the movable-side fully opening stopper 12e to be formed of a synthetic resin because the stopper 12e generally does not strike against any other component during operation. Numeral 12i denotes a guide for engagement of the gear 12 with the lever 9.

The holder 12c for holding the brushes 13 is formed on a peripheral surface of the gear 12, and two brushes 13 are arranged on an outer surface of the holder 13c side by side in the axial direction of the gear 12. A rotational radius from the throttle valve shaft 3 up to the tips of the brushes 13 is set larger than that of the driven gear 12. The reason why two brushes 13 are used is that it is intended to use a dual system (two) of throttle sensors. The dual system is advantageous in that even in the event of failure of one throttle sensor, the other can be used as a substitute and that even in the event of occurrence of any trouble on one sensor side, the trouble can be detected by processing signals provided from both sensors.

For example, as shown in FIG. 8, the brushes 13 are fitted on lugs 12j formed on the holder 12, which lugs 12j are then crushed with heat to fix the brushes onto the holder. Alternatively, the brushes 13 may be fixed using screws or an adhesive.

The gear 12 is fixed to one end 3' of the throttle valve shaft 3 with use of a nut 17 and a washer 18.

The gear 12 is not limited to the one described above. Such gears as illustrated in FIGS. 11 and 12 are also employable.

Figure 11:
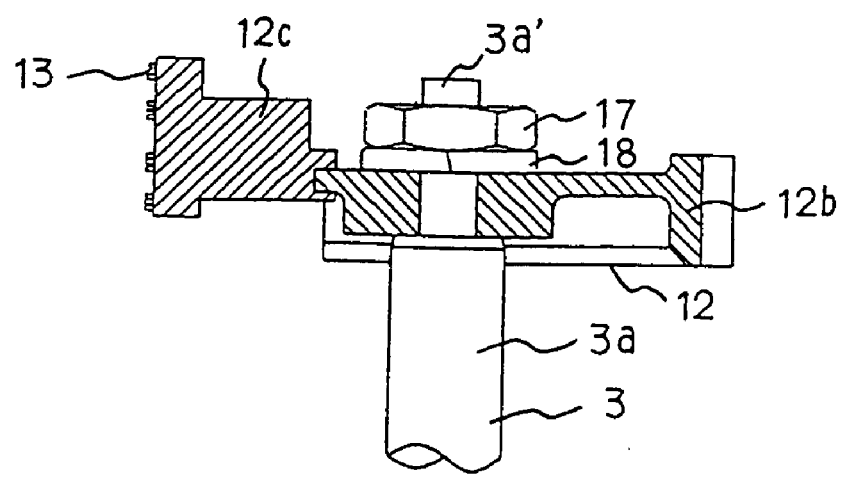
FIGS. 11 and 12 are sectional views showing other examples of driven gears.

In the gear 12 illustrated in FIG. 11, the portion of the brush holder 12c is formed of a synthetic resin, while the teeth-forming area 12b and the remaining portion are formed using a sintered metal, and the brush holder 12c is outer-molded to the gear 12 with use of a resin.

Figure 12:
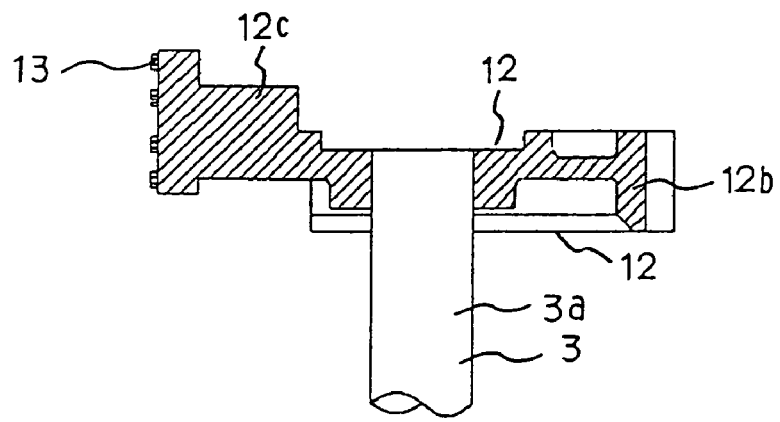

In the gear 12 illustrated in FIG. 12, all the constituent portions of the gear 12, including the brush holder 12c, are formed using a synthetic resin, which resin is insert-molded into one end 3a of the throttle valve shaft 3, thus dispensing with the nut 17 and the washer 18.

The following description is now provided about the cover 16.

A great feature of the cover 16 used in this embodiment is that a stator (resistors and wiring patterns) which constitutes the throttle sensor (potentiometer) 101, as well as a wall portion 15 which holds the stator are provided directly in the cover 16.

Heretofore, for reducing the number of components of a throttle assembly, there has been made an attempt to secure a brush directly to a driven gear in a reduction gear mechanism, but if the member for holding resistors and wiring patterns (conductors) in a potentiometer can be formed by molding integrally with the cover 16, there can be made a further contribution to the reduction in the number of components.

However, in case of forming resistors and wiring patterns directly on an inner surface of the cover 16, since the cover 16 is formed of a synthetic resin, the resistors may be deteriorated in accuracy under the influence of thermal expansion, contraction and deformation of the cover. According to a conventional measure adopted for avoiding such an inconvenience, resistors and wiring patterns are formed on a substrate as a separate member from the cover and the substrate is then attached to the inner surface of the cover.

This embodiment intends to make it possible to mold the holding member (wall portion) 15 for the potentiometer (especially resistors and wiring patterns) integrally with the cover 16 while minimizing the influence of such thermal expansion, contraction and deformation of the cover as just referred to above, and to this end the following means is adopted in the embodiment.

As a basic structure, the wall portion 15 is formed by bending a thin plate in a curvilinearly projecting shape so as to minimize the area thereof occupied on the cover 16 and by raising, like erection, the thus-curved thin plate from the inner surface of the cover. According to such an arcuately curved shape of the wall portion 15, not only the thermal expansion and contraction of the wall portion can be kept to a minimum, but also the wall portion can be enhanced in its rigidity and is difficult to be thermally deformed. In this embodiment, moreover, a reinforcing rib 15d is formed on the back of the wall portion 15 to enhance the strength of the wall portion.

As to the brushes 13, they are mounted on the peripheral surface through the holder 12c so that their tips face in the radial direction of the throttle valve shaft 3. The brushes 13 may be mounted to a component other than the gear 12. For example, a rotor used exclusively for the brush holder may be attached to one end 3a' of the throttle valve shaft 3.

Figure 3:
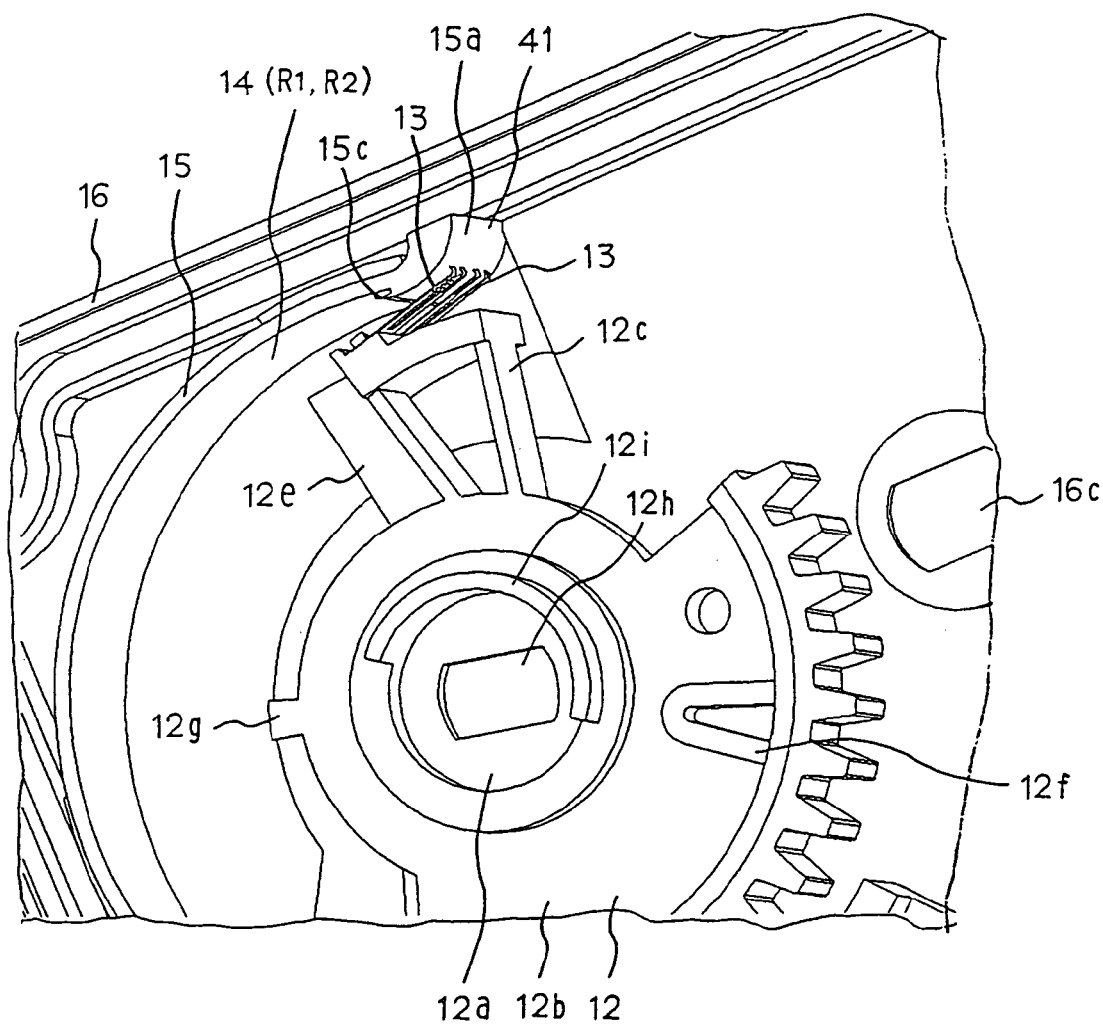
FIG. 3 is a partial perspective view showing the state of FIG. 2 rspectively.

Resistors R1 and R2 (see FIG. 13) on which the brushes 13 slide are formed on one side of a film 14 by printing together with auxiliary resistors R3, R4, conductors 150, 151, 151' which constitute wiring patterns, conductors 141, 142 for taking out signals, and terminals 161~164. As shown in FIGS. 2, 3 and 4, these registers and conductors are arcuately curved together with the film 14. Thus, the resistors R1 and R2 are formed as curved resistors.

The reason why two resistors R1 and R2 are used in the potentiometer and so are the brushes 13 is because it is intended to form two throttle sensors. As to operational characteristics of the potentiometer used in this embodiment, reference will be made thereto later.

Figure 13:
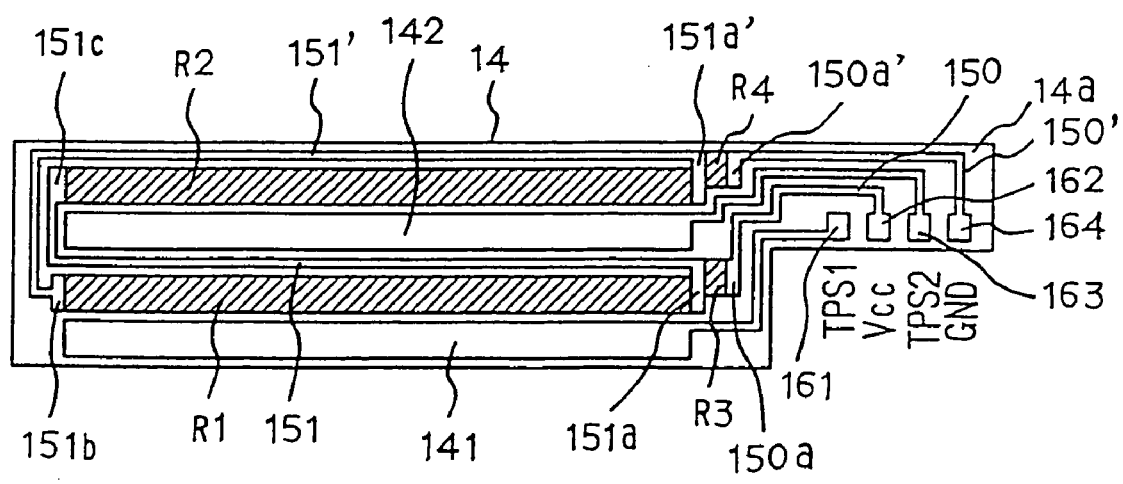
FIG. 13 is a developed view of a film with resistor used in the throttle sensor.

In the other figures than FIG. 13, for example in FIGS. 2, 3, 4 to 6 and 7, the curved resistors R1 and R2 are omitted their illustration for the convenience of drawing. For convenience sake, the film 14 may hereinafter be referred to as the curved resistor or film with resistors.

As noted earlier, the wall portion 15 which holds the curved resistor 14 (i.e., film with resistors R1 and R2) is formed by molding integrally with the cover 16 which covers one end side of the throttle valve shaft of the throttle body 1.

As shown in FIG. 2, the wall portion 15 is formed in conformity with the direction of the bushes 13 and is positioned on the inner surface of the cover 16 and near the corner located on the side opposite to the teeth portion of the gear 12. The wall portion 15 is in a curvilinearly erected shape which draws an arc about the axis of the throttle valve shaft 3.

Now, with reference to FIGS. 13 to 15, a description will be given below about the circuit configuration of the potentiometer and related wiring layout used in this embodiment.

As shown in FIG. 13, the conductor 141 for taking out an output signal and the resistor R1, as well as the conductor 142 for taking out an output signal and the resistor R2, are arranged in parallel on one side of the synthetic resin film (sheet) 14, with auxiliary resistors R3 and R4 being further added.

The conductors 141 and 142 are formed using a material of a low resistivity, e.g., silver paste, while the resistors R3 and R4 are formed using a material of a relatively high resistivity, e.g. carbon, provided no limitation is made thereto.

Actually, the surfaces of the conductors 141, 142, 150, 150', 151 and 151' formed of silver paste for example are also coated with carbon. One of the two brushes 13 slides while straddling both resistor R1 and conductor 141, while the other brush 13 slides while straddling both resistor R2 and conductor 142. The conductors 141, 142 and the brushes 13 turn conductive with each other in the thickness direction of the carbon film at the brush contact positions (the resistance is low because the film thickness is small), so the carbon film formed on the conductors causes no obstacle. Rather, by coating the conductors (silver paste) with a hard carbon, it is possible to improve the abrasion resistance when the brushes 13 slide on the conductors 141 and 142.

The resistor R1 is formed between ends 151a and 151b of a wiring conductor, using only a resistive material. Also as to the resistors R2, R3 and R4, they are formed in the same way.

In FIG. 13, the portions corresponding to the resistors R1, R2, R3 and R4 are hatched. The resistors and wiring layout in FIG. 13 coincide with the circuit diagram of FIG. 14.

At one end 14a of the film 14 are disposed a first sensor output terminal (TPS1) 161, a positive terminal (Vcc) 162 of a power supply, a second sensor output terminal (TPS2) 163, and a ground terminal (GND) 164.

The first sensor output terminal 161 serves as a terminal of the output taking-out conductor 141. The conductor 141 is wider at its portion where the associated brush 13 slides.

The power supply terminal 162 is connected to one end of the auxiliary resistor R3 through the conductor 150, while the opposite end of the auxiliary resistor R3 is connected to one end of the resistor R1 through the conductor end 151a and is also connected to one end of the resistor R2 through the conductor end 151a and the conductor 151. The opposite end of the resistor R1 is connected to one end of the auxiliary resistor R4 through the conductors 151b, 151' and 151a'. The opposite end of the auxiliary resistor R4 is connected to the ground terminal 164 through conductors 150a' and 150'.

The second sensor output terminal 163 serves as a terminal of the output taking-out conductor 142. The conductor 142 is wider at its portion where the associated brush 13 slides.

Figure 14:
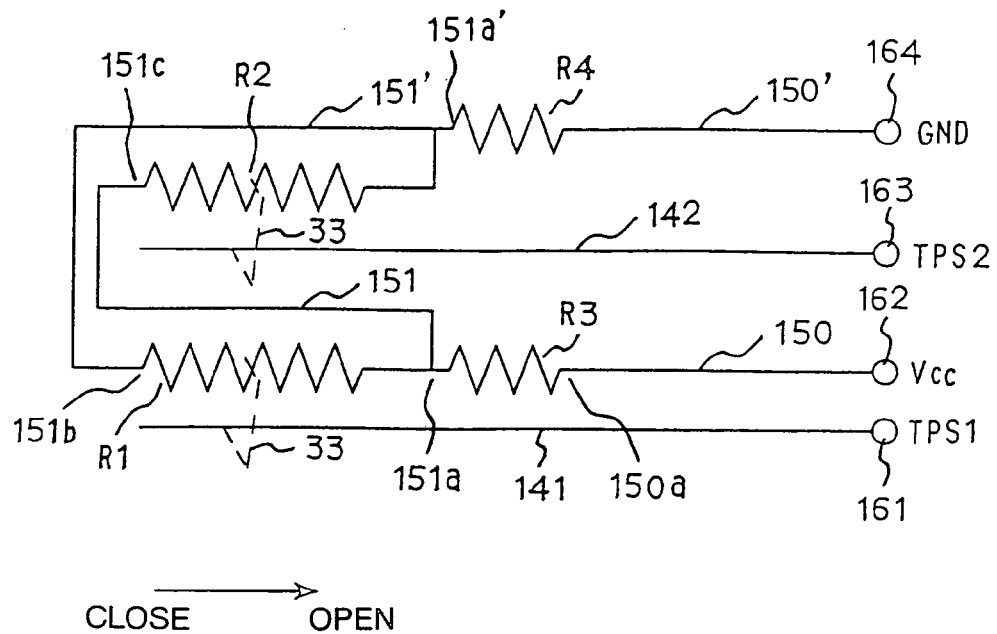
FIG. 14 is a circuit diagram of resistors and wiring patterns shown in FIG. 13.
Figure 15:
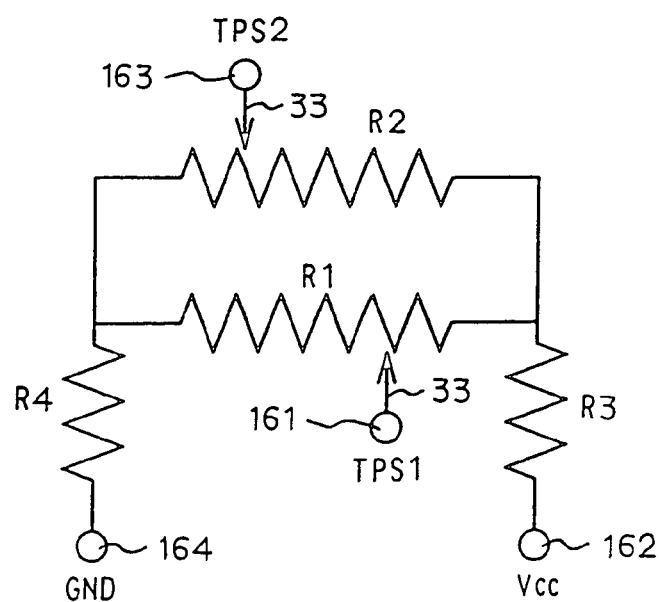
FIG. 15 is an equivalent circuit diagram thereof.

FIG. 14 schematically illustrates a state in which one brush 13 slides while straddling the resistor R1 and the conductor 141 and the other brush 13 slides while straddling the resistor R2 and the conductor 142. According to the wiring illustrated in FIGS. 13 and 14, if the brushes 13 move, for example, in an opening direction from a closed state, the brush 13 which slides on the resistor R1 moves from a low potential side (ground side) to a high potential side (positive side of the power supply), while the brush 13 which slides on the resistor R2 moves from the high to the low potential side. An equivalent circuit thereof is illustrated in FIG. 15. The sensor output terminals 161 and 162 take out potentials at the brush contact points of the resistors R1 and R2.

According to the above wiring patterns, the resistors R1 and R2 are connected at one ends thereof to the positive terminal 162 of the power supply and at the opposite ends to the ground terminal 164. Further, the contact positions of the brushes 13 serve as output points for taking out output voltages, the auxiliary resistor R3 is connected between one ends of the resistors R1, R2 and the positive terminal 162 of the power supply, and the auxiliary resistors R3 and R4 are connected between the opposite ends of the resistors R1, R2 and the ground terminal 164. In other words, the auxiliary resistors R3 and R4 are provided at both ends of the resistors R1 and R2. The resistors R1 and R2 are each several kilo-ohms and the resistors R3 and R4 are each several hundred ohms.

Figure 16:
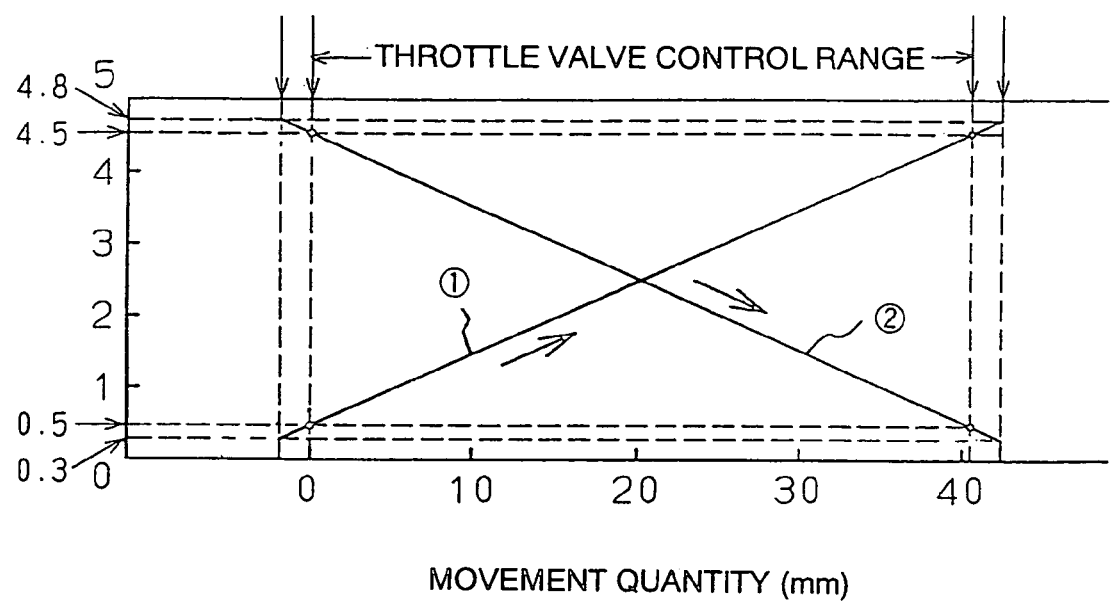
FIG. 16 is an operation characteristic diagram of the throttle sensor used in the embodiment.

FIG. 16 illustrates operational characteristics of sensor output voltages relative to movement quantities (throttle valve openings) of the brushes 13. In the same figure, the movement quantity 0 corresponds to a fully closed position in control of the throttle valve opening and the movement quantity 40 corresponds to a fully open position in control. The numeral ① represents an operational characteristic at the brush contact point potential in resistor R1 and numeral ② represents an operational characteristic at the brush contact point potential in resistor R2. A mean value of both operational characteristics ① and ② lies at an intermediate level of potential. If there should occur any trouble in one of the sensor outputs, the mean value of the operational characteristics ① and ② is biased to either the upper or the lower side of the above intermediate level. From this bias it is possible to judge which sensor is out of order.

By using the auxiliary resistors 33 and 34 it is possible to make gentle the gradient of the sensor output characteristics (operational characteristics ① and ②) relative to the movement quantity of the brushes (throttle valve opening) and hence possible to diminish output variation characteristics induced by changes in temperature of the resistors for example.

In this connection, reference will now be made, for example, to the case where the power supply voltage is 5V and the ground voltage is 0V. In this case, in the absence of resistors R3 and R4, a voltage of 5V is applied to both ends of the resistors R1 and R2, but in the presence of the auxiliary resistors R3 and R4 as in this embodiment, the voltage at one ends (the ground side) of the resistors R1 and R2 is raised to a higher level (say, 0.3V) than zero level because of the presence of resistor R3, while the voltage at the opposite ends (the positive side of the power supply) becomes somewhat lower (say, 4.7V) than 5V because of the presence of resistor R4. Thus, the potential difference at both ends of the resistors R1 and R2 becomes 4.4V, so that the gradient of output characteristics (operational characteristics ① and ②) relative to the movement quantity of the brushes becomes smaller than that at the both-end potential difference of 5V of the resistors R1 and R2 (in the absence of the auxiliary resistors R3 and R4). Therefore, even where the operational characteristics vary according to temperatures, the variation range is made narrow to prevent deterioration of the sensor accuracy.

Although in this embodiment the auxiliary resistors R3 and. R4 are disposed at both ends of the resistors R1 and R2, such an auxiliary resistor R3 or R4 as described above may be disposed at only one ends of the resistors R1 and R2, and even in this case it is possible to narrow the variation range of the sensor operation characteristics.

As shown in FIG. 13, one end 14a of the film 14 is made small in width and the terminals 161~164 are arranged on one side of the one end 14a.

Figure 7:
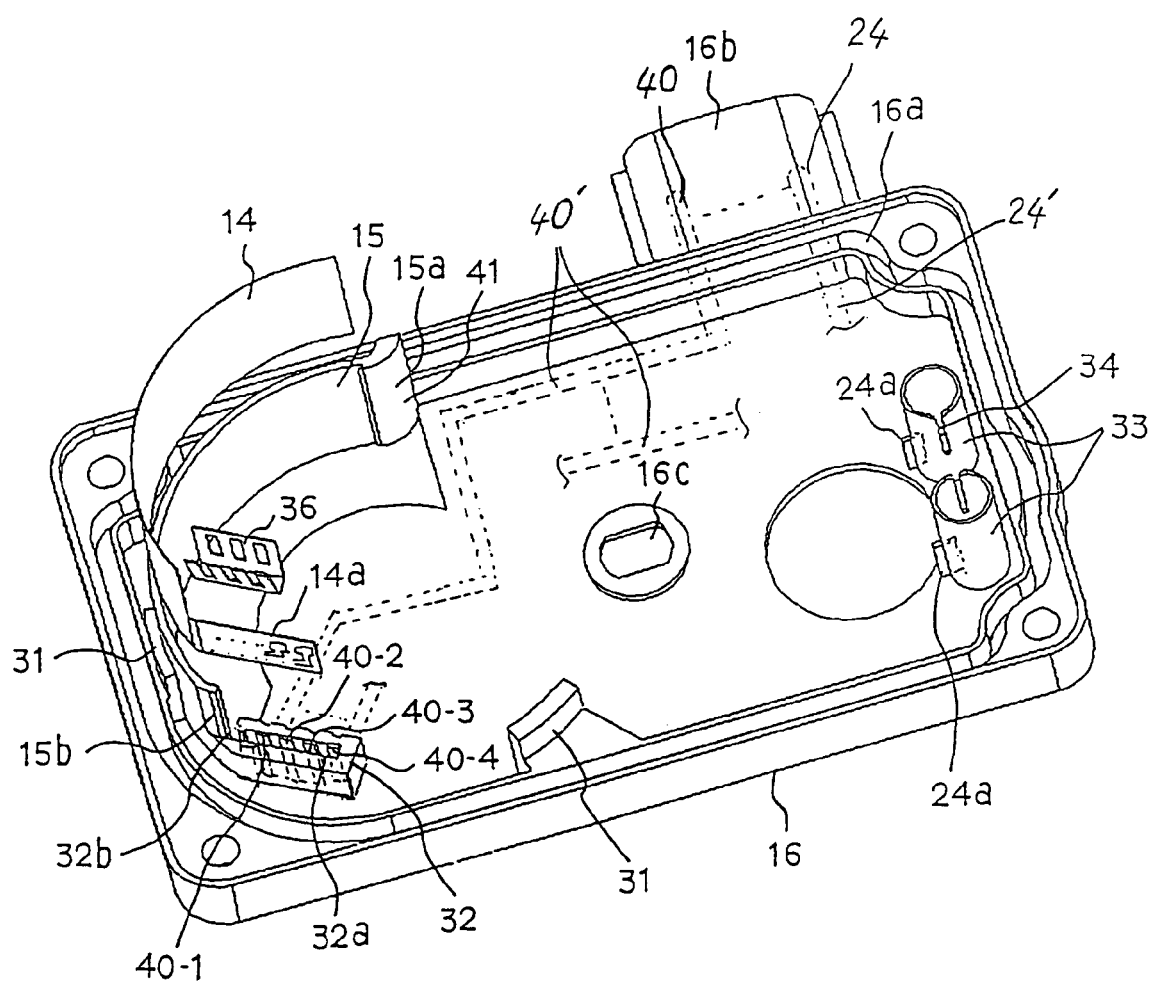
FIG. 7 is a perspective view showing, in a disassembled state, components of a throttle sensor which is attached to the cover.

On the inner surface of the cover 16, as shown in FIGS. 2 and 7, a terminal box 32 for insertion therein of one end 14a of the film is formed by the side of the wall portion 15 integrally with the cover 16.

In the terminal box 32, an upper portion 32a and a side portion 32b close to the wall portion 15 are open so that one end 14a of the film can be inserted therein.

At the position of the terminal box 32 the terminals 161~164 formed at one end of the film 14 and relay terminals 40-1 to 40-4, which communicate with connector terminals, are connected together electrically.

Figure 9:
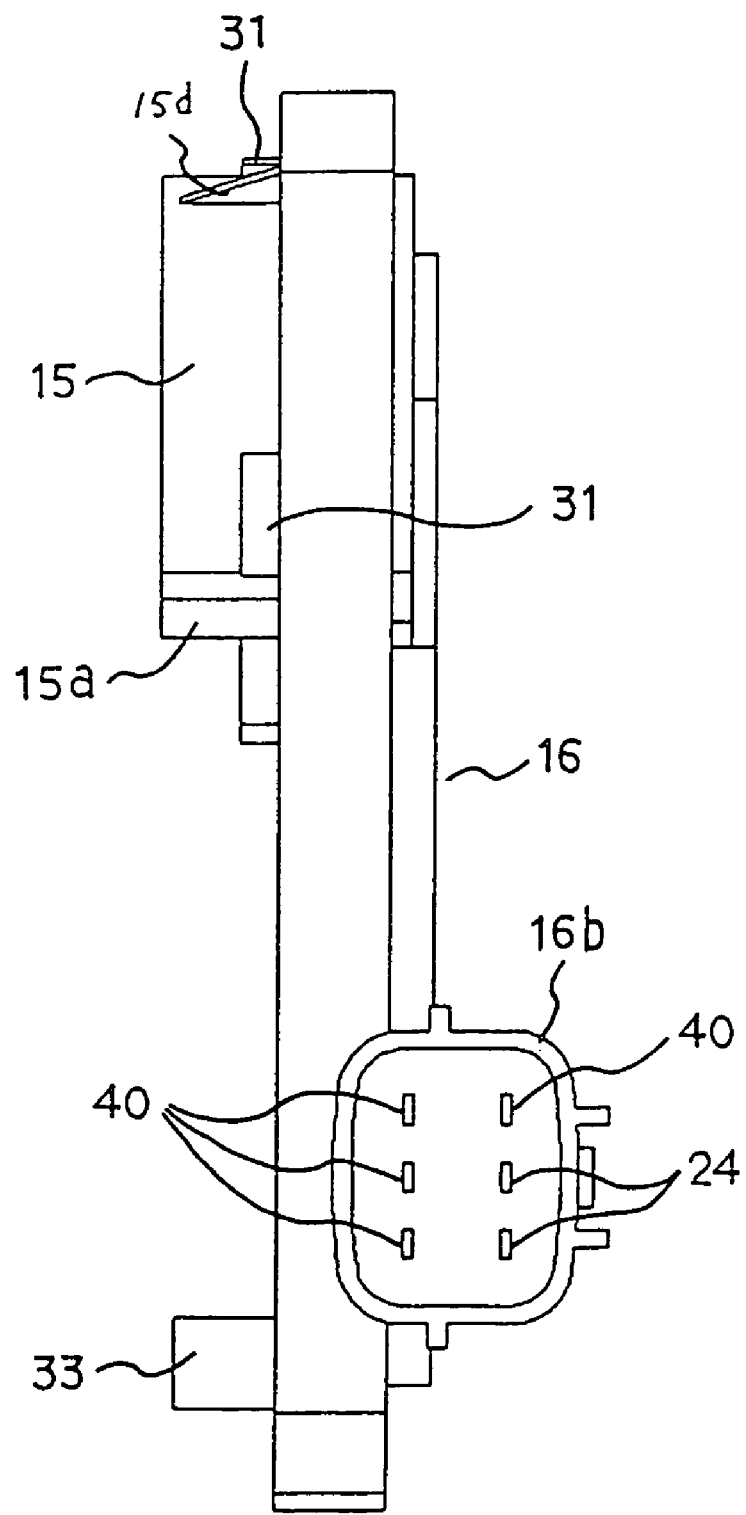
FIG. 9 is a side view of the cover.

More specifically, as shown in FIG. 9, connector terminals 40 (four in this embodiment) for external connection of the throttle sensors and connector terminals 24 (two in this embodiment) for external connection of the motor power supply are disposed in a connector case 16b of the cover 16. Conductors 40' for connection between the connector terminals 40 and the throttle sensors and conductors 24' for connection between the connector terminals 24 and the relay terminals 24a of the motor power supply are insert-molded into the cover 16 (this state is shown in FIG. 7 with the conductors partially omitted) and one ends of the conductors 40', i.e., the terminals 40-1 to 40-4, are erected so as to be positioned by the side of one end 15b of the wall portion which is for holding the curved resistors, in other words, they rise so as to project upward from the inner surface of the cover 16, further, one ends 24a of the conductors 24' of the motor power supply are erected from the inner surface of the cover 16.

One end 14a of the film 14 is inserted into the terminal box 32 in such a manner that the terminals 161~164 formed on the film 14 and the terminals 40-1~40-4 conducted into the terminal box 32 confront each other, and a plate spring 36 serving as a film pressing member is inserted into the terminal box 32, whereby the terminals can be connected positively without separation. The relay terminals 24a on the motor side and the motor terminals 23 are connected together through the relay connectors 33.

Advantages of this embodiment are as follows.

① In the throttle sensor, the brushes 13 come into contact with the curved resistors 14 (R1, R2) while facing in the radial direction of the throttle valve shaft 3. This is advantageous in point of reliability.

More particularly, the brushes 13 are mounted on the throttle valve shaft through the holder, but an assembling error developed in the throttle valve shaft is generally larger in the thrust direction than in the radial direction. The reason is that variations in machining and variations in assembly accumulate to 1 mm or so in the radial direction, whereas in the thrust direction there occur only coaxiality deviation and variations among molded products, which can be suppressed to below several hundred micron meters.

Consequently, the separating force of each brush from the associated resistor induced by wobbling of the throttle valve shaft is larger in the case where the brush is brought into contact (sliding contact) with the resistor in the thrust direction of the throttle valve shaft (the contact in this case is a plane contact) than in the case where the brush is brought into contact with the resistor in the radial direction of the throttle valve shaft (the contact in this case is a curved contact). Therefore, in the former (plane contact) case, it is necessary that the contact pressure of the brush against the resistor be set larger than in the latter (curved contact) to prevent the brush and the resistor from coming out of contact with each other. So increasing the contact pressure will accelerate the wear of the brush and that of the resistor.

This embodiment adopts the latter method, whereby it is possible to prevent the brush-resistor separation without so much increasing the contact pressure. Consequently, it is possible to enhance the reliability of the throttle sensor and also enhance the abrasion resistance and durability of the sensor components.

② Even in case of adopting such a curved contact (curved resistor) type throttle sensor (potentiometer) as described above, this embodiment makes it possible to reduce the number of components and reduce the product cost. More particularly, for mounting a curved resistor type sensor into the cover 16 of the throttle body 1, there may be adopted a different method wherein the throttle sensor is beforehand unitized separately from the cover and is then installed into the cover. In this case, however, it is necessary that sensor components (e.g., resistor, rotor with brush, and resistor holding member) be accommodated together into a dedicated unit case (sensor housing). On the other hand, this embodiment dispenses with such a sensor unit as mentioned above and permits the gear 12 to serve also as the rotor with brush. In this embodiment, moreover, since the curved resistor holding member (wall portion 15) is integral with the cover 16, it is possible to reduce the number of throttle sensor components and hence reduce the product cost and simplify the assembling work.

Further, although the curved resistor holding portion is provided in the cover, it is possible to ensure a high sensor accuracy because there is adopted a structure which is difficult to be influenced by thermal expansion, contraction and deformation of the cover.

③ By providing at least one of the auxiliary resistors R3 and R4 in each throttle sensor it is possible to obtain operational characteristics of the sensor with suppressed thermal variation.

④ It is possible to simplify the bearing structure of the throttle valve shaft having the throttle sensors; besides, it is possible to reduce the number of components used and thereby realize a compact bearing protecting structure.

In more particular terms, according to this embodiment, only one end 3a' of the throttle valve shaft 3 is projected to the exterior of a side wall of the throttle body and the reduction gear mechanism and the throttle sensors are disposed on the throttle body side face on the projecting side of the throttle valve shaft.

Thus, where the reduction gear mechanism and the throttle sensors are arranged together on one side face of the throttle body, a highly accurate bearing such as the ball bearing 6 or any other rolling bearing of reduced wobbling may be used as the bearing for the throttle valve shaft on the side where the above components are arranged, while a bearing, e.g., plain bearing, which is less expensive but somewhat inferior in accuracy than the ball bearing, may be used as the other bearing.

Further, since the plain bearing 26 is cap-shaped and covers one bearing boss 1*b* on the throttle valve shaft, it is possible to omit the use of a dedicated cap or cover for the bearing boss 1*b*.

⑤ Additionally, according to this embodiment, at least one end 15*a* of the wall portion 15 which holds the curved resistor 14 is rounded at 41, so at the time of positioning the brushes 13 on the curved resistor after installation of the gear 12 and the cover, the brushes 13 can be mounted easily by allowing them to slide on the rounded surface 41. The numeral 15*c* in FIGS. 2 and 3 denotes a stepped portion to be used for positioning the film 14, the stepped portion 15*c* being formed at one end of the wall portion 15. Also for mounting the film 14 to the wall portion 15, for connecting the sensor terminals and for mounting the brushes, this embodiment adopts a structure which takes the easiness of those works into account, thus permitting the reduction of the working cost.

Although in the above embodiment the film 14 with curved resistors is affixed to the wall portion 15, the resistors and wiring patterns may be printed directly onto the surface of the wall portion 15.

INDUSTRIAL APPLICABILITY

According to the present invention, as set forth above, it is possible to provide a throttle assembly and a throttle sensor, capable of contributing to the reduction in the number of components of the throttle sensor, capable of reducing the manufacturing cost and simplifying the assembling work and further capable of ensuring high sensor accuracy and reliability.

What is claimed is:

1. A throttle assembly comprising a throttle body and, as components mounted to the throttle body, a throttle valve for controlling the flow rate of intake air in an internal combustion engine, an electrically-driven actuator for actuating the throttle valve, a reduction gear mechanism for the actuator, and a sensor for detecting the degree of opening of the throttle valve, wherein one end of a throttle valve shaft is projected outwards from a side wall of the throttle body, said reduction gear mechanism and said sensor are disposed on a side face of the throttle body on the projecting side of said throttle valve shaft, a bearing which supports one side shaft-part close to the projecting part of the throttle valve shaft, out of bearings which support the throttle valve shaft, is a ball bearing, a bearing, which supports the other side shaft-part opposite to the projecting part of the throttle valve is a plain bearing, a cap, and one end of the plain bearing is covered with a gear of the reduction gear mechanism is fixed on the projecting part of the throttle valve shaft, a coil spring arrangement having a return spring element and a default spring element for the throttle valve is provided around a boss for the ball bearing and a part of the throttle shaft, and one end of the coil spring arrangement is operatively joined to the throttle body, and the other end thereof is joined to the throttle valve.

2. The throttle assembly according to claim 1, wherein the plain bearing is cap-shaped with a cap integrated into the plain bearing, and a bearing mount hole of the boss is closed with the cap-shaped plain bearing.

3. A throttle sensor for detecting the degree of opening of a throttle valve which controls the flow rate of intake air in an internal combustion engine, wherein the throttle sensor is constituted by a potentiometer whose output varies according to the rotation of the throttle valve, said potentiometer comprising a slider adapted to rotate integrally with a throttle valve shaft and a resistor on which the slider slides, the resistor being connected at one end thereof to a positive-side terminal of a power supply and at the other end thereof to a ground-side terminal wherein the resistor is comprised of a first resistor element and a second resistor element which are divided so as to be parallel with each other and connected in parallel between the positive side terminal of the power supply and the ground side terminal, the first and the second resistor elements are connected to the positive side terminal through a first auxiliary resistor and connected to the ground side terminal through a second auxiliary resistor, additionally a first conductor and a second conductor are placed alternately together with the first and the second resistor elements in parallel, each one end of the conductors is opened, the other end thereof is each an output terminal, and the slider is comprised of two slider elements which are slidable together in the same direction, and one of the slider elements is slidable between the first resistor element and the first conductor, and the other of the slider elements is slidable between the second resistor element and the second conductor.

4. The throttle sensor according to claim 3, wherein the slider is fixed on a resin gear.

5. The throttle sensor according to claim 4, wherein the resin gear has a metallic plate having a shaft through-hole, and being fixed on the resin gear by insert molding, and the resin gear is fixed on the projecting part of the throttle shaft through the metallic plate.

6. The throttle sensor according to claim 4, wherein a resin portion of the gear has integrated resin lugs, the slider has through-holes for the lugs, and the slider is fixed at the gear by crushing with heat the lugs inserted the through-hole.

7. The throttle sensor according to claim 3, wherein the first and the second resistor elements have values of several kilo-ohms, and the auxiliary resistor have values of several hundred-ohms.

* * * * *